May 16, 1933.　　　　E. NIELSEN　　　　1,909,497
ELECTRIC MOTOR
Filed May 31, 1932
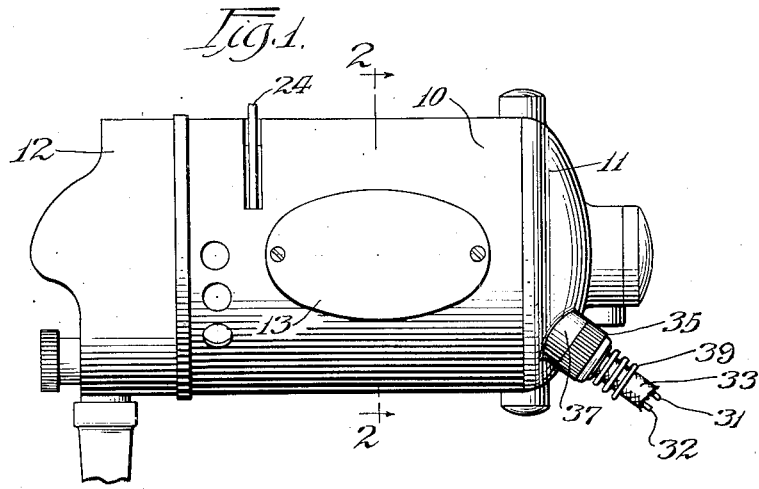
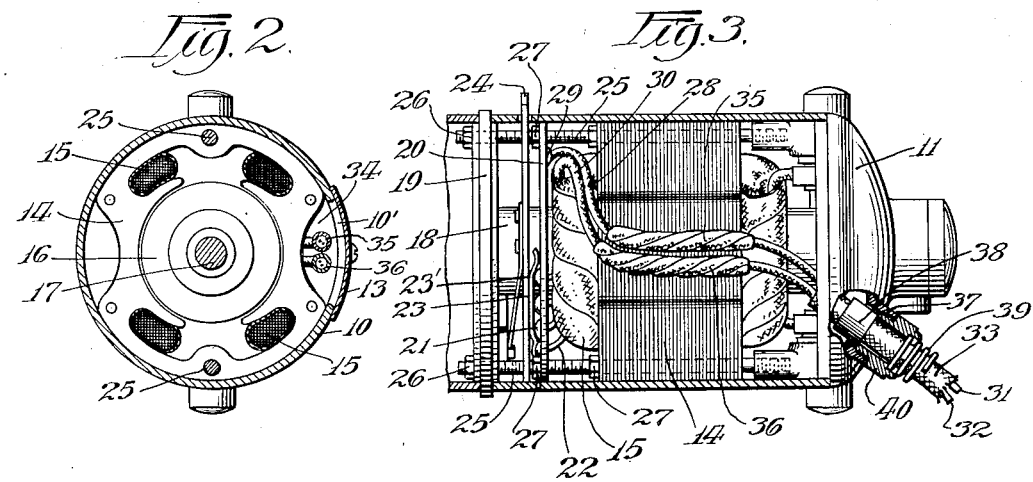
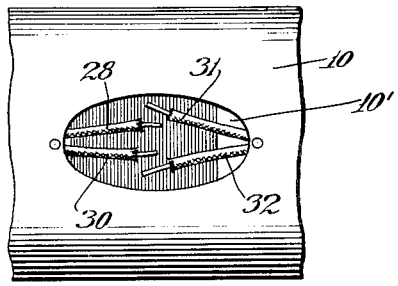
Inventor:
Emanuel Nielsen
By Bertha L. MacGregor
Attorney.

Patented May 16, 1933

1,909,497

UNITED STATES PATENT OFFICE

EMANUEL NIELSEN, OF RACINE, WISCONSIN, ASSIGNOR TO HAMILTON BEACH MANUFACTURING COMPANY, OF RACINE, WISCONSIN, A CORPORATION OF WISCONSIN

ELECTRIC MOTOR

Application filed May 31, 1932. Serial No. 614,335.

This invention relates to electric motors, and particularly to a motor which is part of a portable utensil, such as a food mixer.

In devices of the character described, the motors are supplied with conductor or supply wires which connect the field coils to a source of electrical current.

In a food mixer motors which have a speed regulator built into the motor unit, as disclosed and claimed in my application Serial No. 497,669 filed November 24th, 1930, patented August 9, 1932, No. 1,871,274, the covered conductor wires extend into the motor casing, from the rear to the forward end of the motor, lying in the space provided by the shape of the field laminations, between the inner surface of the field and the armature recess; the skinned, lead-in end of one conductor wire being connected directly to the speed regulator ring and the skinned end of the other wire being connected to a field coil lead very close to the point where the field coil lead leaves the field coil.

To repair the conductor cord or replace the same with a new one, in a motor of the class described, it was necessary to remove the end bell, separate the motor from the gear housing, press the field laminations out of the motor casing, make the repair, put the field laminations back into the motor casing, connect the gear housing to one end and secure the rear end bell to the other end of the motor casing.

The object of the present invention is to provide a motor in which the conductor wires may be repaired or removed and replaced without dismantling the motor or casing.

While the invention is of special advantage when embodied in motors of the kind herein described, it will be understood that it may be embodied in various constructions of motors; the main advantage being the saving of time and trouble heretofore required in disassembling the motor casing and motor parts to afford access to the conductor wires within the casing.

Other advantages of the construction will be apparent from the following description:

In the drawing:

Fig. 1 is a side elevation of a motor embodying my invention.

Fig. 2 is a transverse section taken on the line 2—2 of Fig. 1.

Fig. 3 is a side elevation of the motor, part of the casing being in section.

Fig. 4 shows part of the motor of Fig. 1, with the cover plate removed and disclosing part of the motor interior.

In that embodiment shown in the drawing, the motor casing is indicated at 10, the rear end bell at 11, the gear housing at 12, and the removable name plate at 13 for covering the opening 10'. Within the casing are the field laminations 14, field coils 15, 15, armature 16 and armature shaft 17, journalled in the end bell 11 and the bearing 18 carried by the fixed plate 19 between the motor and gear housing. The speed regulator constitutes no part of this invention, per se, and, therefore, it will suffice to briefly mention the parts, i. e., the fixed regulator ring 20 carrying contact points 21, the latter being connected by tap wires 22 to a field coil 15, and a hand operated regulator member 23 protruding from the motor casing at 24, carrying a spring contact arm 23' for contact with the points 21. The plate 19, fixed regulator ring 20, field laminations 14 and end bell 11 are held in fixed position relatively to the motor casing 10 by the bolts 25, 25 and nuts 26, 27.

Referring now to that part of the construction which is the subject of this invention, a short, insulated lead wire 28, sufficiently long to extend from the regulator ring 20 to the side of the motor casing 10 and to the center of the opening 10', is connected at 29 to said plate 20. A similar lead wire 30 is connected with the untapped field coil 15 and extends toward the side of the motor casing 10 and to the center of the opening 10'.

The conductor cord comprises two insulated wires 31, 32, in a sheath 33. The sheath 33 is removed from the ends of the wires 31, 32, and the skinned ends are located adjacent the opening 10', in the space 34 provided between the concave side of the field laminations 15 and the plate 13. The skinned ends of the wires 28 and 31 and of the wires 30 and 32, are connected together and soldered.

The connected ends are protected by tape 35, 36.

The conductor cord extends into the motor casing through the end bell 11, and on that part of the conductor cord just within the tubular projection 37 of the end bell 11, is fixed a tie or clip 38. A coiled wire 39 surrounds the sheath 33 and is movable thereon. The end of the coil 39 is connected to a ring 40 having a screw threaded end adapted to fit within the internally screw threaded end of the tubular projection 37. When the ring 40 has been secured in place, the inner end engages the clip 38 and prevents the conductor cord from being pulled outwardly.

In order to make a repair or to remove a worn conductor cord and install a new one, the cover plate 13, which may also function as a manufacturer's name plate, is removed, the old conductor wires are disconnected from the lead wires, and after the ring 40 has been unscrewed, the worn cord may be removed. Then a new cord may be inserted through the part 37 and the ends of the wires 31, 32 connected to the lead wires 28 and 30, respectively, without disassembling or disarranging any of the motor parts. Considerable labor was necessitated, in repairing prior art devices, in removing from the motor casing 10 the gear housing 12, bolts 25, nuts 26, 27, and end bell 11, and in forcing out of the casing 10 the motor and speed regulator parts, to render accessible the wire connections heretofore located on the regulator ring and close to one of the field coils at the forward end of the motor casing. All this labor and inconvenience is avoided by the use of this invention.

Changes may be made in details of construction without departing from the scope of my invention and I do not intend to be limited to the exact form shown and described, except as set forth in the appended claims.

I claim:—

1. An electric motor comprising a casing having an opening through its wall, field laminations and field coils within the casing, lead wires connected to the field coils and extended around the laminations to a point accessible through said opening, a conductor cord comprising supply wires extending through and into the motor casing and having their free ends connected to said lead wires, and a cover plate removably attached to the casing to close said opening.

2. An electric motor comprising a casing having an opening through its wall, field laminations and field coils within the casing, the surface of the field laminations adjacent the opening being concave and providing a space between the laminations and the casing wall, lead wires connected to the field coils and extended around the laminations into said space to a point accessible through said opening, a conductor cord comprising supply wires extending through and into the motor casing and having their free ends connected to said lead wires, and a cover plate removably attached to the casing to close said opening.

3. An electric motor comprising a casing having an opening through its wall, field laminations and field coils within the casing, lead wires connected to the field coils and extended around the laminations to a point accessible through said opening, a conductor cord comprising supply wires extending through and into the motor casing and having their free ends connected to said lead wires, means on the conductor cord for removably engaging the motor casing at the point where the conductor cord emerges from the casing, and a cover plate removably attached to the casing to close said opening.

4. An electric motor comprising a casing having an opening through its wall, field laminations and field coils within the casing, a speed regulator located between said field coils and one end of the motor, the regulator comprising a member connected by tap wires to a field coil, a lead wire connected to said regulator member, a second lead wire connected to a field coil, a conductor cord comprising a pair of supply wires extending through and into the motor casing, the ends of the two lead wires and of the supply wires being located between the field laminations and the casing, accessible through the casing opening, each lead wire being adapted for connection to a conductor wire, and a cover plate removably secured to the casing to close said opening.

5. An electric motor comprising a casing having an opening through its wall, field laminations and field coils within the casing, the surface of the field laminations adjacent the opening being concave and providing a space between the laminations and the casing wall, a speed regulator located between said field coils and one end of the motor, the regulator comprising a member connected by tap wires to a field coil, a lead wire connected to said regulator member, a second lead wire connected to a field coil, a conductor cord comprising a pair of supply wires extending through and into the motor casing, the ends of the two lead wires and of the supply wires being located between the field laminations and the casing, accessible through the casing opening, each lead wire being adapted for connection to a conductor wire, and a cover plate removably secured to the casing to close said opening.

In testimony, that I claim the foregoing as my invention, I affix my signature, this 27th day of May, 1932.

EMANUEL NIELSEN.